(12) United States Patent
Jiang et al.

(10) Patent No.: US 10,187,155 B2
(45) Date of Patent: Jan. 22, 2019

(54) OPTICAL TRANSCEIVER, COMMUNICATION SYSTEM, AND ADAPTIVE FREQUENCY CONTROL METHOD

(71) Applicants: Zhiping Jiang, Kanata (CA); Chuandong Li, Ottawa (CA); Zhuhong Zhang, Ottawa (CA); Xuefeng Tang, Ottawa (CA)

(72) Inventors: Zhiping Jiang, Kanata (CA); Chuandong Li, Ottawa (CA); Zhuhong Zhang, Ottawa (CA); Xuefeng Tang, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/352,040

(22) Filed: Nov. 15, 2016

(65) Prior Publication Data

US 2018/0138980 A1    May 17, 2018

(51) Int. Cl.
*H04B 10/00* (2013.01)
*H04B 10/40* (2013.01)
*H04B 3/32* (2006.01)
*H04B 10/556* (2013.01)
*H04Q 11/00* (2006.01)
(Continued)

(52) U.S. Cl.
CPC ............... *H04B 10/40* (2013.01); *H04B 3/32* (2013.01); *H04B 10/5563* (2013.01); *H04B 10/572* (2013.01); *H04B 10/61* (2013.01); *H04J 14/0282* (2013.01); *H04Q 11/0067* (2013.01); *H04B 2210/254* (2013.01); *H04Q 2011/0047* (2013.01)

(58) Field of Classification Search
USPC .......................................... 398/25, 162, 163
See application file for complete search history.

(56) References Cited

U.S. PATENT DOCUMENTS 4,893,353 A * 1/1990 Iwaoka .................... G02F 1/11
                                                         398/183
4,912,526 A * 3/1990 Iwaoka .................... G02F 1/11
                                                         398/196
(Continued)

FOREIGN PATENT DOCUMENTS

CN      101931469 A    12/2010
WO      2013068150 A1   5/2013

*Primary Examiner* — Agustin Bello

(57) ABSTRACT

An optical transceiver is provided with an optical front end for receiving signal light comprising an optical sub-channel, and for providing an electrical signal based on the signal light; a light source optically coupled to the optical front end for providing local oscillator light thereto for mixing with the signal light; an electro-optical modulator coupled to the light source for receiving output light therefrom and for modulating the output light with digital information to obtain modulated light; and a signal processor operably coupled to the optical front end. The signal processor is configured for processing the electrical signal to obtain a frequency offset of the sub-channel; and adjusting an optical frequency of the modulated light based on the frequency offset. When applied to a multiple-access environment, this may allow access nodes to generate optical sub-channels in the uplink direction using the downlink optical signal as an optical frequency reference.

20 Claims, 8 Drawing Sheets

(51) Int. Cl.
*H04B 10/572* (2013.01)
*H04B 10/61* (2013.01)
*H04J 14/02* (2006.01)

(56) References Cited

U.S. PATENT DOCUMENTS

| | | | |
|---|---|---|---|
| 7,379,672 B2* | 5/2008 | Wang | H04B 10/25751 |
| | | | 356/451 |
| 7,526,211 B2* | 4/2009 | McNicol | H04B 10/50 |
| | | | 398/128 |
| 9,160,480 B2* | 10/2015 | Cvijetic | H04J 14/0282 |
| 9,450,680 B2* | 9/2016 | Sakai | H04B 10/6164 |
| 9,735,888 B2* | 8/2017 | Fludger | H04B 10/6164 |
| 2005/0201759 A1* | 9/2005 | Wang | H04B 10/25751 |
| | | | 398/183 |
| 2007/0206963 A1 | 9/2007 | Koc | |
| 2009/0274462 A1* | 11/2009 | Yu | H04B 10/2587 |
| | | | 398/68 |
| 2010/0215368 A1* | 8/2010 | Qian | H04J 14/0282 |
| | | | 398/67 |
| 2011/0222854 A1* | 9/2011 | Roberts | H04B 10/532 |
| | | | 398/70 |
| 2012/0294614 A1* | 11/2012 | Cvijetic | H04J 14/002 |
| | | | 398/67 |
| 2014/0029959 A1 | 1/2014 | Koizumi et al. | |
| 2014/0241717 A1* | 8/2014 | Cvijetic | H04Q 11/0067 |
| | | | 398/48 |
| 2014/0328588 A1* | 11/2014 | Sakai | H04B 10/6164 |
| | | | 398/38 |
| 2014/0334830 A1 | 11/2014 | Pierrottet et al. | |
| 2015/0319028 A1* | 11/2015 | Razmtouz | H04J 13/0059 |
| | | | 398/67 |
| 2016/0146869 A1* | 5/2016 | Marsland, Jr. | H04B 10/0731 |
| | | | 324/76.77 |
| 2017/0117969 A1* | 4/2017 | Fludger | H04B 10/6164 |

* cited by examiner

OPTICAL TRANSCEIVER, COMMUNICATION SYSTEM, AND ADAPTIVE FREQUENCY CONTROL METHOD

FIELD

The present application relates to optical communication systems and, in particular, to multiple-access optical communication systems.

BACKGROUND

In a typical dense wavelength division multiplexing (DWDM) optical communication system, there are multiple (e.g. 80, 88 or 96) channels or wavelengths, with a 50 GHz spacing between two neighbouring channels. The data rate of each channel may be very large, e.g. 100 Gbps, 200 Gbps or even higher. In some applications, finer wavelength granularity is desired, i.e., more channels with reduced data rate.

One problem encountered when using a greater density of channels is cross-talk between channels, because channels are tightly packed to reduce spectral gap to avoid spectrum waste. As such, it would be useful in the industry to find a way to reduce the potential for cross-talk amongst optical channels without sacrificing the overall data rate.

SUMMARY

Certain non-limiting embodiments of the present invention may be applicable to a multiple-access environment, and may allow access nodes to generate optical sub-channels in the uplink direction using the downlink optical signal as an optical frequency reference. Since the downlink optical signal is commonly received at all access nodes, the same optical frequency reference may be used to stabilize center frequency of multiple uplink sub-channels by different access nodes. This may allow tight packing of uplink sub-channels with relatively small guard bands and relatively low potential for cross-talk.

Therefore, according to a first broad aspect, there is provided an optical transceiver, comprising an optical front end for receiving signal light comprising an optical sub-channel, and for providing an electrical signal based on the optical sub-channel; a light source optically coupled to the optical front end for providing local oscillator light thereto for mixing with the signal light; an electro-optical modulator coupled to the light source for modulating the output light with digital information to obtain modulated light; and a signal processor operably coupled to the optical front end. The signal processor is configured for processing the electrical signal to obtain a center frequency offset of the optical sub-channel; and based on the frequency offset of the optical sub-channel, adjusting an optical frequency of the modulated light.

According to a second broad aspect, there is provided an optical transceiver, comprising an optical front end for receiving signal light; a light source optically coupled to the optical front end for providing local oscillator light thereto for mixing with the signal light; an electro-optical modulator coupled to the light source for receiving output light therefrom and for modulating the output light with digital information to obtain modulated light for sending to a remote node; and a signal processor operably coupled to the optical front end. The signal processor is configured for obtaining, from the remote node, a first feedback signal based on an optical frequency of the modulated light received at the remote node; and adjusting the optical frequency of the modulated light based on the first feedback signal.

According to a third broad aspect, there is provided a method, which comprises mixing local oscillator light with received signal light comprising an optical sub-channel and converting a result of the mixing to an electrical signal, wherein the electrical signal is based on the optical sub-channel; processing the electrical signal to obtain a frequency offset of the optical sub-channel; modulating output light with digital information to obtain modulated light; and adjusting an optical frequency of the modulated light based at least in part on the frequency offset of the optical sub-channel.

According to a fourth broad aspect, there is provided an optical communication system, comprising a first network element and a plurality of second network elements. The first network element broadcasts a first optical signal to the plurality of second network elements. Each one of the second network elements transmits a respective one of a plurality of second optical signals to the first network element. Each respective one of the second network elements is configured for adjusting an optical frequency of the respective second optical signal based on an optical frequency difference between component local light produced at the respective second network element and the first optical signal produced at the first network element.

These and other aspects and features of the present invention will now become apparent to those of ordinary skill in the art upon review of the following description of specific embodiments in conjunction with the accompanying drawings.

BRIEF DESCRIPTION OF THE DRAWINGS

In the accompanying drawings.

DETAILED DESCRIPTION

Figure 1:
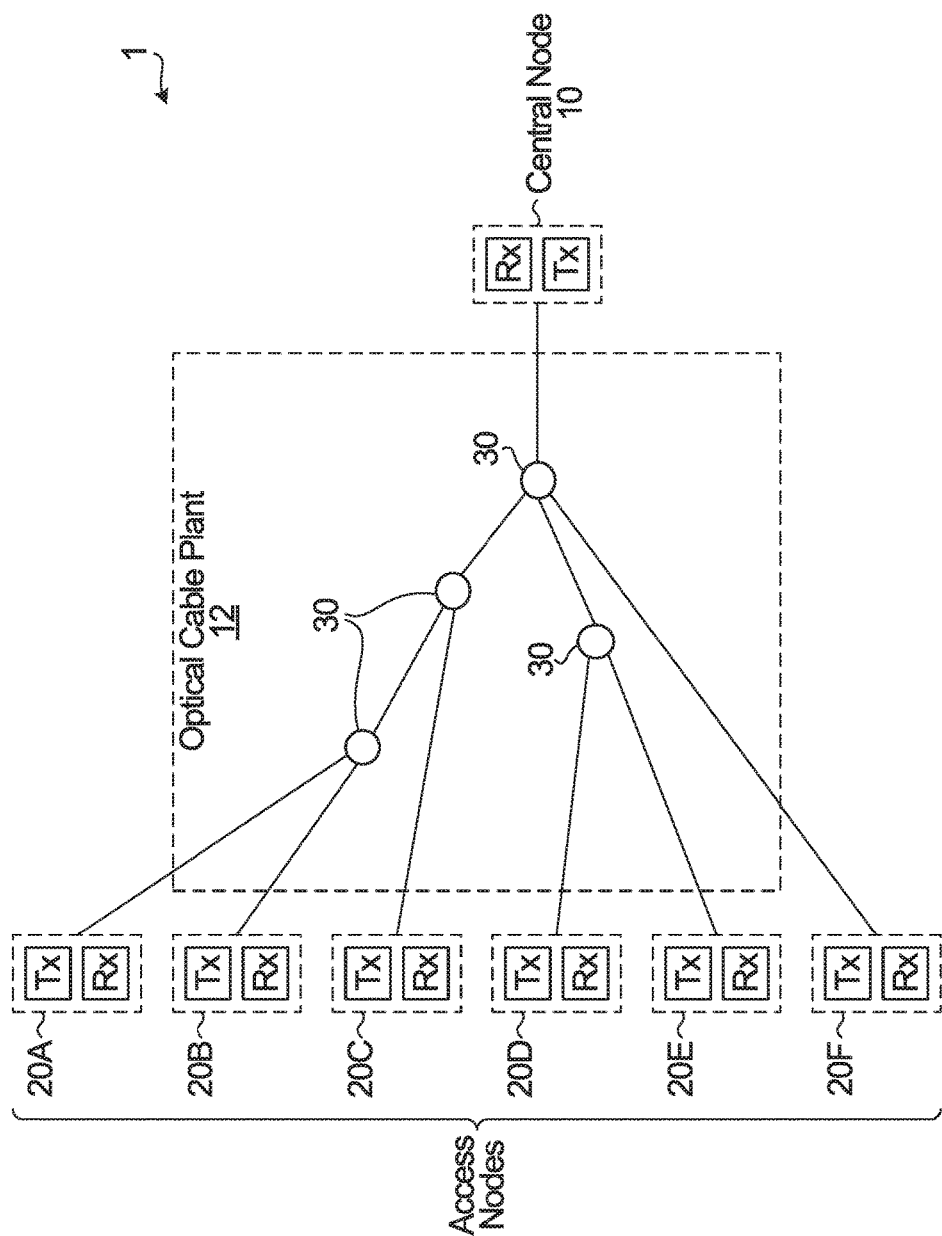
FIG. 1 is a block diagram illustrating an optical network including a central node and a plurality of access nodes, in accordance with a non-limiting embodiment.
Figure 9:
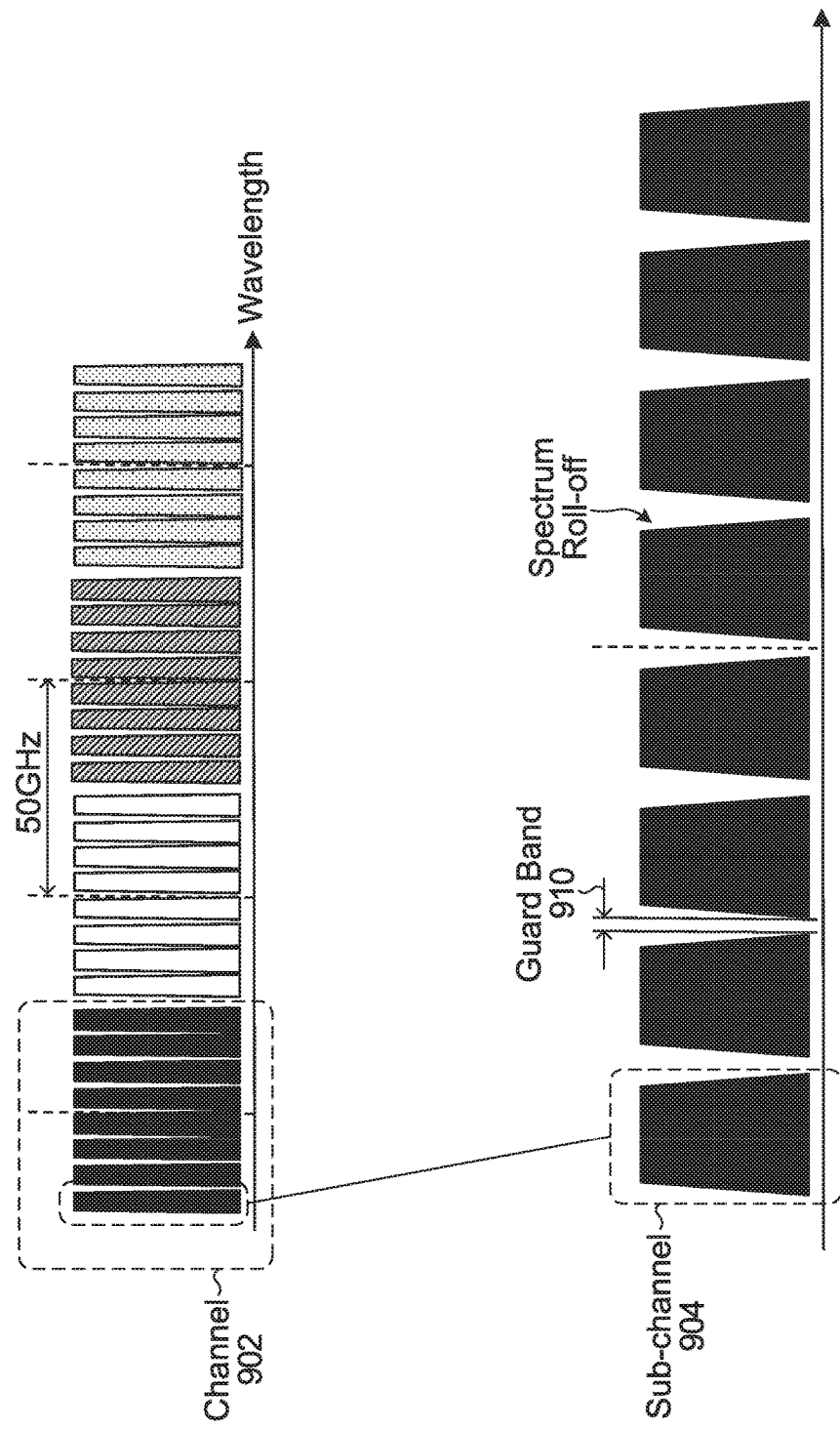
FIG. 9 is a diagram showing division of the optical frequency spectrum into wavelength division multiplexed (WDM) channels and sub-channels within each channel, in accordance with a non-limiting embodiment.

Referring to FIG. 1, an exemplary optical network 1 includes a first network element (referred to as a central node 10) coupled to a branch of second network elements (referred to as access nodes 20A, 20B, 200, 20D, 20E, and 20F) via an optical cable plant 12, which may include separate spans of optical fibers for uplink and downlink directions, optical couplers 30, optical amplifiers (not shown) and other equipment. The central node 10 broadcasts downlink optical signals in a plurality of wavelength division multiplexed (WDM) channels. Each one of the access nodes 20A-20F may include a coherent receiver, which can tune to a WDM channel of interest. For a finer granularity of wavelength selection, each WDM channel can be further divided into sub-channels, as shown in the diagram of FIG. 9, where WDM channel 902 is shown as having eight (8) sub-channels 904. However, the number of sub-channels per WDM channel is not material to the present invention, and different WDM channels may have different numbers of sub-channels. The data rate of each sub-channel is limited by the number of sub-channels per channel and by spectrum roll-off. Also, to avoid cross-talk, a guard band 910 is defined between sub-channels, further limiting the data rate available on each sub-channel.

In a multiple-access system, each of the access nodes 20A-20F may be assigned one or more sub-channels for communication with the central node 10, including possibly one or more of the sub-channels 904 of WDM channel 902. For simplicity, in the presently described embodiment, each one of the access nodes 20A-20F of the branch may tune to a single dedicated sub-channel of a same WDM channel, while other WDM channels may be used to communicate with other branches of access nodes, which are not shown in FIG. 1 for the sake of clarity. However, this correspondence between branches and WDM channels is not required, and multiple WDM channels or sub-channels may be used for downlink transmission to a particular one of the access nodes 20A-20F. Multiple WDM channels/sub-channels may also be used for uplink transmission from each access nodes 20A-20F towards the central node 10, which may include corresponding multiple pairs of transmitters and receivers (not shown for brevity).

In the downlink direction (from the central node 10 to the access nodes 20A-20F), the central node 10 has control of the relative spectral positions of all of the sub-channels because one laser is used and sub-channels are generated digitally. However, in the uplink direction, the relative spectral positions of the sub-channels originating from different access nodes 20A-20F are determined by optical frequencies of corresponding local light sources, e.g. laser diodes. In other words, center frequencies of the sub-channels are dependent on the laser frequency accuracy of the individual access nodes 20A-20F.

Figure 10:
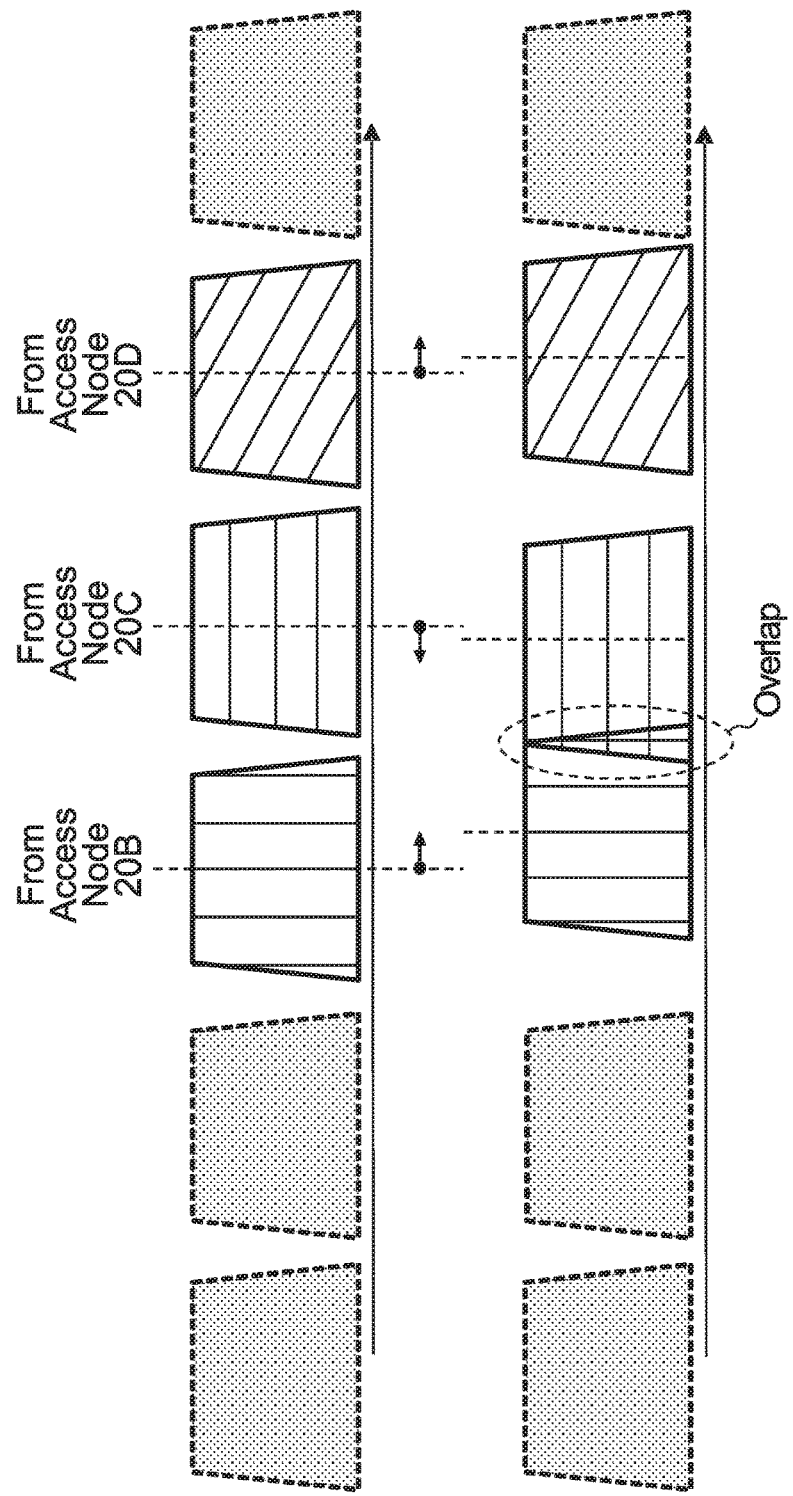
FIG. 10 is a diagram showing utilization of the optical frequency spectrum by several sub-channels in the case of no misalignment and in the case of misalignment of the center frequency, in accordance with a non-limiting embodiment.

With reference to FIG. 10, there is shown utilization of the optical frequency spectrum by the sub-channels that are emitted by various ones of the access nodes, including, in this case, access nodes 20B, 20C and 20D. It is noted that the potential for misalignment exists due to inaccurate and/or uncoordinated control of laser wavelengths at the access nodes 20B, 200 and 20D. The top portion of FIG. 10 shows the ideal situation where there is no sub-channel misalignment, whereas the bottom portion of FIG. 10 sows the situation where there is sub-channel misalignment due the sub-channels from access nodes 20B and 20D having migrated in a different direction than the sub-channel from access node 200. In particular, the center frequencies of the sub-channels from access nodes 20B and 20D have increased while the center frequency of the sub-channel from access node 200 has decreased. When such misalignment becomes sufficiently severe, it leads to overlap amongst neighboring sub-channels received at the central node 10, as seen in the bottom portion of FIG. 10. This overlap may cause cross-talk, which would be undesirable.

Figure 2:
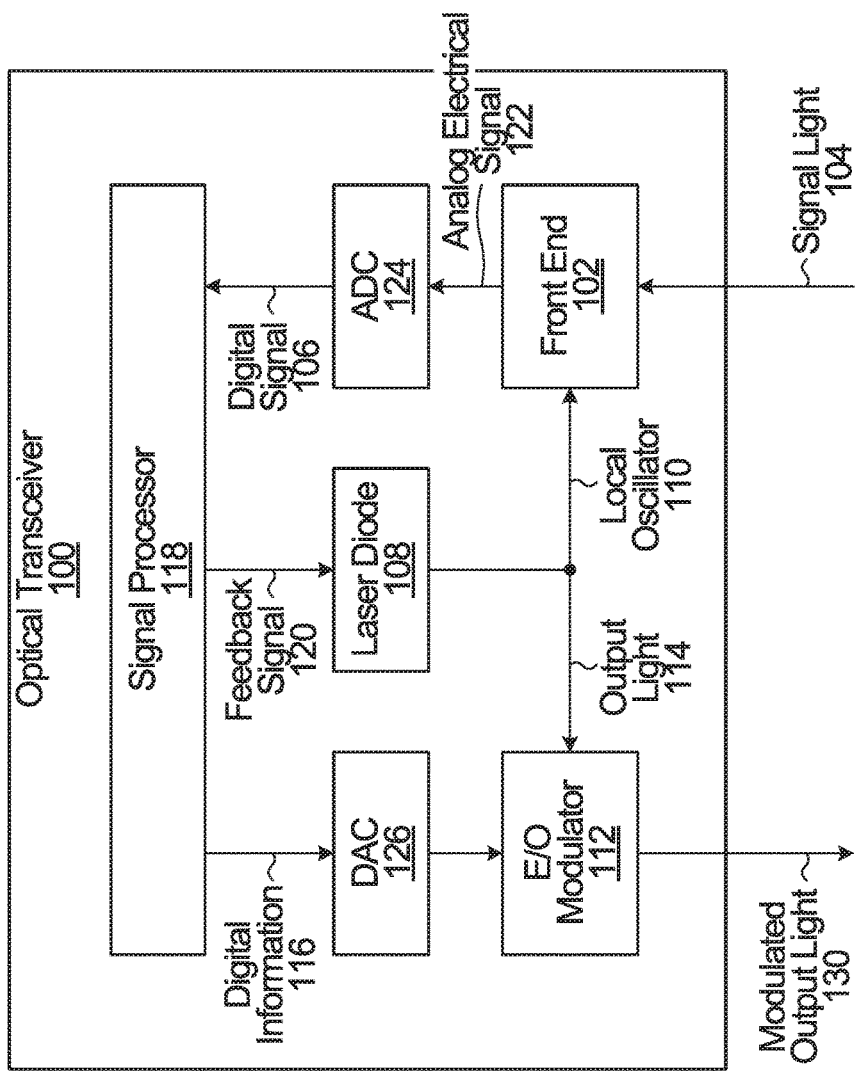
FIG. 2 is a block diagram of an optical transceiver, in accordance with a non-limiting embodiment.

FIG. 2 shows a first non-limiting embodiment of a coherent optical transceiver 100, which may be implemented in access nodes 20A-20F for bidirectional communication with the central node 10 in the optical network 1. The optical transceiver 100 includes an optical front end 102 for receiving signal light 104, e.g. from the central node 10 of FIG. 1 and for providing an analog electrical signal 122 based on the signal light 104. The analog electrical signal 122 is converted into a digital signal 106 by an analog-to-digital converter ADC 124. A light source in the form of a laser diode 108 is optically coupled to the optical front end 102 and provides a local oscillator light (or local reference light) 110 to the optical front end 102 for mixing with the signal light 104. An electro-optical modulator 112 is also coupled to the laser diode 108 and receives output light 114 from the laser diode 108.

The modulator 112 modulates the output light 114 with digital information 116 received from the signal processor 118 that has been converted into analog form by a digital-to-analog converter (DAC) 126. This yields modulated output light 130. It is noted that in this embodiment, the local oscillator light 110 and the output light 114 are generated by the same laser diode 108 and travel along branches of a coupler (not shown) connected to an output of the laser diode 108.

The signal processor 118 is operably coupled to the optical front end 102 and processes the digital signal 106 at the output of the optical front end 102 to obtain its center frequency. The significance of this center frequency represents a "frequency offset", which will be explained in further detail herein below. Based on this "frequency offset", the signal processor 118 provides a feedback signal 120 to the laser diode 108, thereby causing an optical frequency of the output light 114 to be adjusted. In addition, as previously described, the signal processor 118 is operable to provide the digital information 116 to the modulator 112 via the DAC 126.

Figure 3:
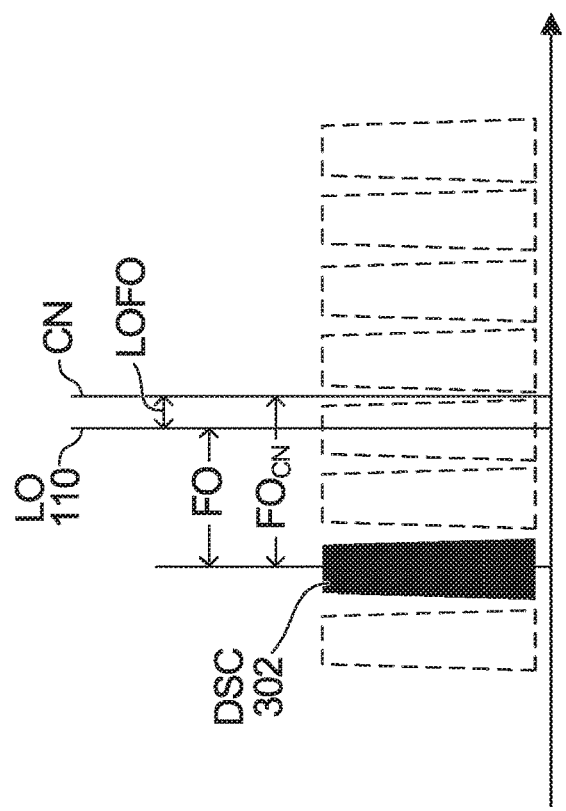
FIG. 3 is a spectrum diagram illustrating frequency tuning, in accordance with a non-limiting embodiment.

In accordance with a non-limiting embodiment, the feedback signal 120 is used to carry out frequency tuning. With reference to FIG. 3, there is shown a spectrum diagram illustrating frequency tuning in accordance with a non-limiting embodiment. Specifically, the local oscillator light 110, with a frequency denoted "LO", is mixed in the optical front end 102 with the signal light 104. The signal light 104 includes a downlink sub-channel (DSC) 302 having a known frequency offset $FO_{CN}$ relative to the downlink WDM channel center frequency, denoted "ON". The result of mixing the local oscillator light 110 with the signal light 104 in the optical front end 102 is the generation of a signal (namely, analog electrical signal 122) centered at a differential frequency, or frequency offset ("FO"), between the optical frequency of the DSC and the optical frequency of the local oscillator light 110.

The signal processor 118 then, as alluded to above, processes the digital signal 106 (which is the digital version of the analog electrical signal 122) to obtain its center frequency, corresponding to the frequency offset FO of the DSC 302. Then, the signal processor 118 may further compute the offset between FO and $FO_{CN}$, which can be referred to as the local oscillator frequency offset ("LOFO"), as shown in FIG. 3. It is noted that LOFO is equal to the difference between LO and CN. The signal processor 118 of the optical transceiver 100 may be configured to adjust the optical frequency of the output light 114 ("LO") using the feedback signal 120 so that LOFO (the difference between LO and CN) is close to zero, or to a pre-determined value other than zero, if required.

In this manner, the DSC 302 in the signal light 104 received at the optical front end 102 is used as an optical frequency reference. A similar approach can be carried out at multiple ones of the access nodes 20A-20F, and any downlink sub-channel may be used for this purpose, as long as the corresponding offset relative to the downlink WDM channel center frequency is known. As a result, the optical frequency of the local oscillator light 110 of each one of the access nodes 20A-20F may be tied to an optical frequency of the downlink WDM channel center frequency. One advantage of this configuration is that a possible drift of the downlink WDM channel center frequency causes equivalent drift of optical frequencies of the modulated output light 130 of each access node 20A-20F. When the drift of optical frequencies of the modulated output light 130 of each of the access nodes 20A-20F is coordinated, i.e. has substantially same magnitude and sign, the resulting interference between the modulated output light 130 of the access nodes is lessened, since all the spectral sub-bands shift together, as a whole.

Figure 4:
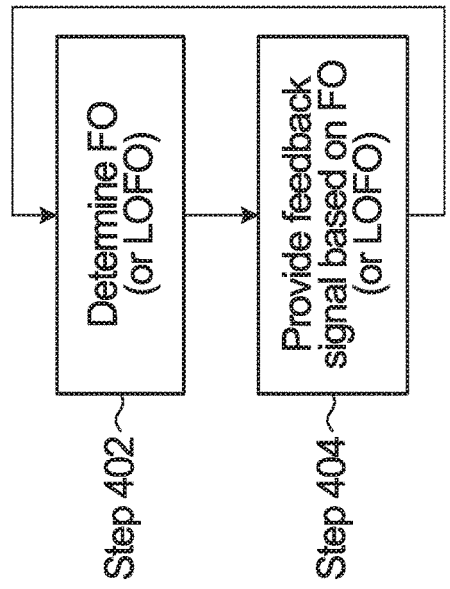
FIG. 4 is a flowchart illustrating steps performed by a signal processor of the optical transceiver of FIG. 2, in executing the tuning of FIG. 3.

The manner in which the signal processor 118 generates the feedback signal 120 from the digital signal 106 is now described with reference to the flowchart in FIG. 4 illustrating steps performed by the signal processor 118.

At step 402, the signal processor 118 determines the center frequency of the analog electrical signal 122 by processing the digital electrical signal 106. This center frequency, as explained above, is equal to the frequency offset FO of the DSC 302, which is the difference between the optical frequencies of the local oscillator light 110 and the DSC 302. When FO is determined, LOFO may be determined as $FO-FO_{CN}$, where $FO_{CN}$ is a known value.

At step 404, a feedback signal 120 is provided based on the obtained LOFO value. The feedback signal 120 may be used to tune the laser diode 108 optical frequency LO, e.g., by changing the temperature of the laser diode 108. By adaptively adjusting (tuning) the laser diode 108 on the basis of the feedback signal 120, it is possible for LO to either track CN or to be spaced from CN by a required frequency gap.

Thus, it will be appreciated that an adaptive process is provided whereby received signal light is mixed with local oscillator light and the result of the mixing is converted to an analog electrical signal. The digital signal obtained from converting the analog electrical signal into digital form is processed to obtain its center frequency, which corresponds to the frequency offset of the DSC 302. Output light modulated with digital information has its optical frequency adjusted based at least in part on the frequency offset of the DSC 302.

When the reference optical frequency present in the signal light 104 is stabilized in accordance with the above described process, so too will be the optical frequency of the output light 114. The access nodes 20A-20F of FIG. 2 would track the drift in similar way, such that the sub-bands generated by the access nodes the access nodes 20A-20F will not overlap, thus reducing crosstalk. This wavelength referencing or tracking can be achieved in the absence of a wavelength locker, which may reduce the cost of the transceiver 100.

In a variant of the above embodiment, the signal processor 118 does not provide a feedback signal 120 to the laser diode 108, but rather applies additional frequency shifting to the signal carrying the digital information 116. As a result of modulating a digital signal that is already digitally frequency shifted at the outset, the optical frequency of the modulated output light 114 will be adjusted as if it had been adjusted optically; however, this is not due to tuning of the laser diode 108, but rather due to the information-carrying signal having a wider bandwidth.

In practice, satisfactory frequency tracking may occur when LOFO is kept below a certain threshold value. One extreme case is where LOFO is kept to zero, and thus there will be no relative frequency shift between uplink sub-channels. As a result, with a guard band at a minimum value or even zero, there will be no cross-talk amongst neighboring uplink sub-channels.

On the other hand, if LOFO is permitted to be non-zero but less than a threshold value (e.g., X MHz), each uplink sub-channel may shift in frequency by X MHz, which means that two neighboring uplink sub-channels may drift and approach one another by a relative frequency shift of 2X MHz. Thus, the guard band 910 should be designed to be at least 2X MHz.

It should be further understood that the adaptive process may run continuously throughout operation of the access node, so as to maintain LOFO at or close to zero, or below the aforesaid threshold value.

In the aforementioned embodiment of the optical transceiver 100, the same laser diode 108 is used for providing both the local oscillator light 110 and the output light 114. The feedback signal 120 is then provided to the laser diode 108 to adjust its optical frequency LO, which influences both the local oscillator light 110 and the output light 114. However, this need not be the case in all embodiments. Separate laser diodes may be provided for convenience, one to operate as a local oscillator, and another to provide light to the modulator 112. The concept of wavelength referencing described above may be extended for the case of two laser diodes or light sources.

Figure 5:
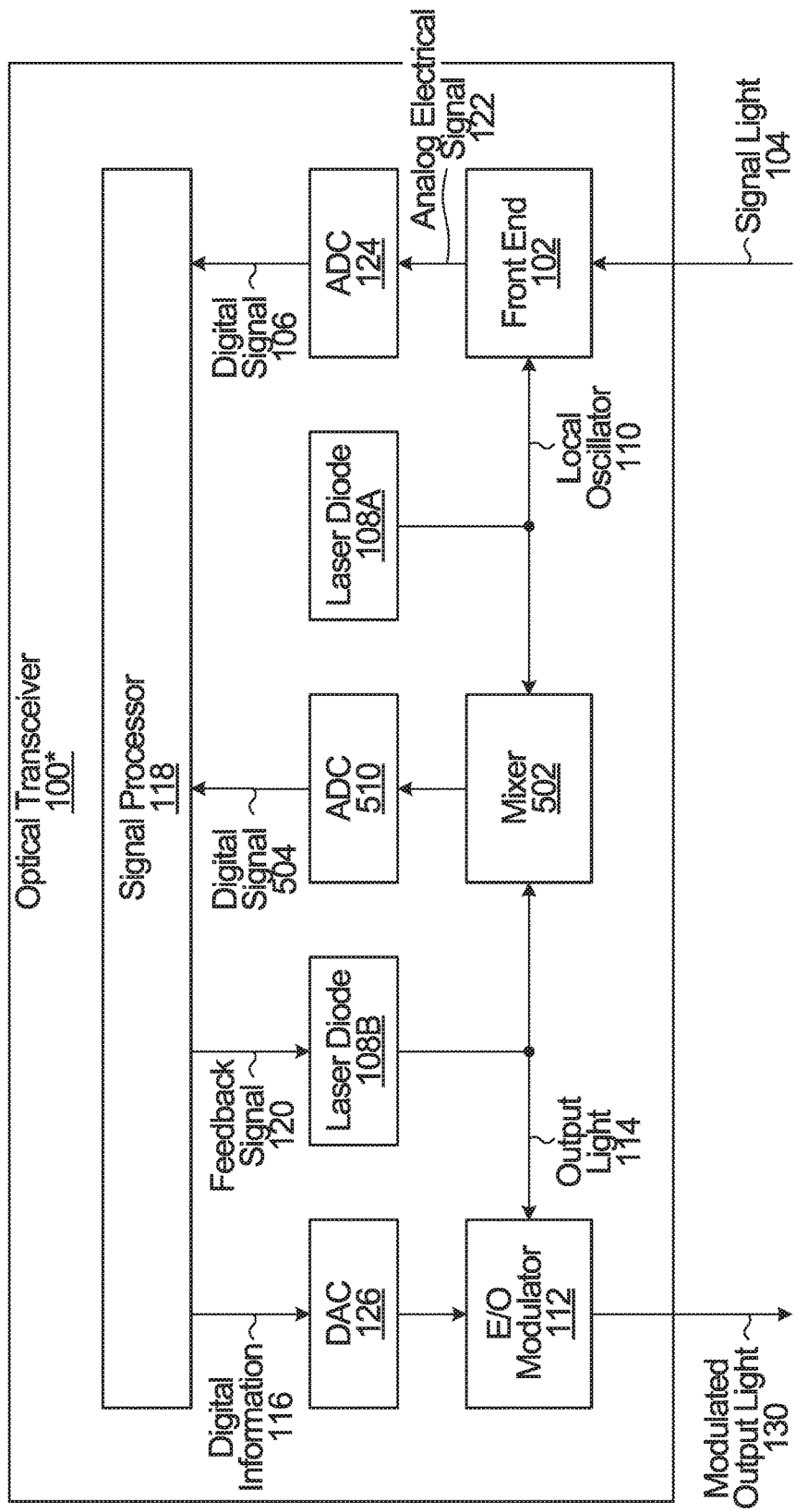
FIG. 5 is a block diagram of an optical transceiver, in accordance with another non-limiting embodiment.
Figure 6:
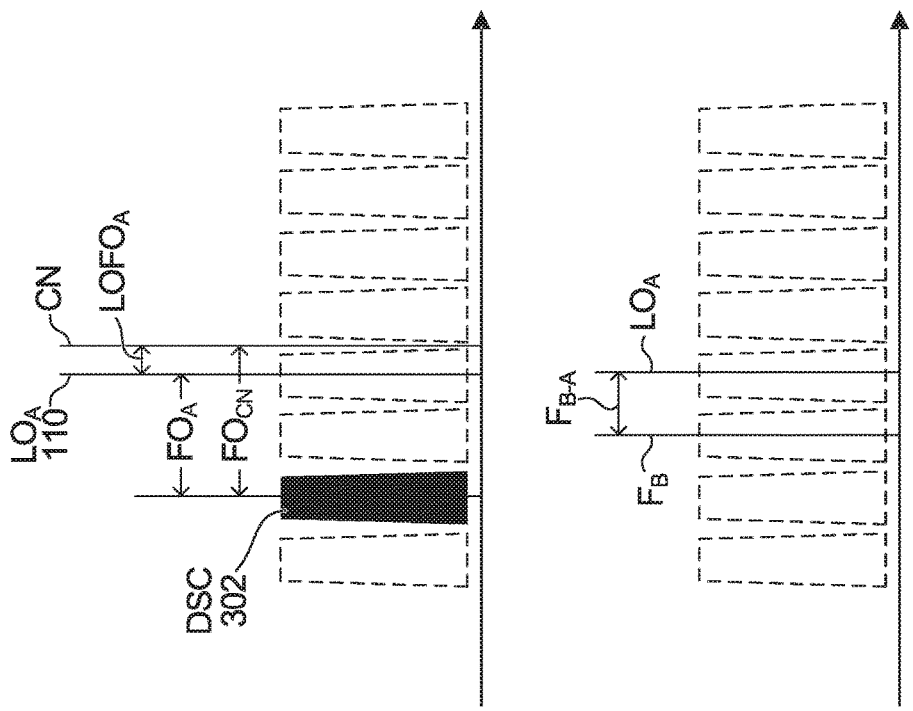
FIG. 6 is a spectrum diagram illustrating frequency tuning, in accordance with another non-limiting embodiment.

Specifically, with reference to FIGS. 5 and 6, there is shown a second embodiment of an optical transceiver 100\* (FIG. 5). In this embodiment, the light source includes both a first laser diode 108A that provides the local oscillator light 110 (at an optical frequency $LO_A$, see FIG. 6) and a second laser diode 108B that provides the output light 114 (at an optical frequency $F_B$). As such, the local oscillator light 110 and the output light 114 are no longer generated by a single laser diode. To tie together the optical frequencies of the laser diodes 108A and 108B, a mixer 502 may be coupled to the first and second laser diodes 108A, 108B for obtaining a digital signal 504 centered at a differential frequency (denoted $F_{B-A}=F_B-LO_A$), namely the difference between the optical frequency $F_B$ of the output light 114 and the optical frequency $LO_A$ of the local oscillator light 110. In this embodiment, an analog-to-digital converter (ADC) 510 is coupled to an output of the mixer 502 and generates an electronic signal 504 that is centered at $F_{B-A}$. The signal processor 118 receives the electronic signal 504 from the ADC 510, and is configured for providing the feedback signal 120 based on the differential frequency $F_{B-A}$ in the digital signal 504.

Figure 7:
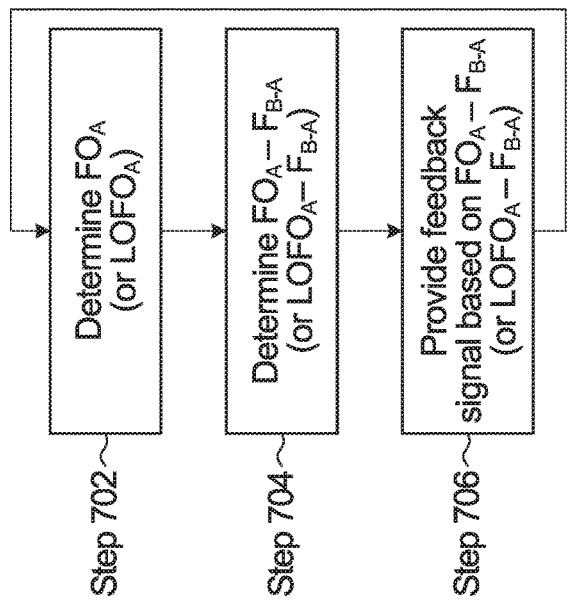
FIG. 7 is a flowchart illustrating steps performed by a signal processor of the optical transceiver of FIG. 5, in executing the tuning of FIG. 6.

Steps performed by the signal processor 118 in this second embodiment are now described with additional reference to the diagram in FIG. 6 and the flowchart in FIG. 7. Specifically, the local oscillator light 110, with a frequency denoted "$LO_A$", is mixed in the optical front end 102 with the signal light 104. The signal light 104 includes a downlink sub-channel (DSC) 302 having a known frequency offset $FO_{CN}$ relative to the downlink WDM channel center frequency, denoted "ON". The result of mixing the local oscillator light 110 with the signal light 104 in the optical front end 102 is the generation of an optical signal centered at a differential frequency, or frequency offset ("$FO_A$"), between the optical frequency of the DSO and the optical frequency of the local oscillator light 110.

At step 702, the signal processor 118 obtains the center frequency $FO_A$ of the resulting digital signal 106. Then, the signal processor 118 may compute the difference between $FO_A$ and $FO_{CN}$, which can be referred to as the local oscillator frequency offset ("$LOFO_A$"), as shown in FIG. 6. It is noted that $LOFO_A$ is equal to the difference between $LO_A$ and ON.

At step 704, the signal processor corrects the frequency offset $FO_A$ (or $LOFO_A$, as the case may be) to account for the differential frequency $F_{B-A}$ detected in the signal output by the mixer 502. To that end, the signal processor may compute $FO_A - F_{B-A}$ (or $LOFO_A - F_{B-A}$).

At step 706, the signal processor 118 of the optical transceiver 100 may be configured to adjust the optical frequency of the output light 114 ("LO") using the feedback signal 120 so that $FO_A$ $F_{B-A}$ (or $LOFO_A$ $F_{B-A}$) is close to zero, or to a pre-determined threshold value other than zero, if required. Specifically, the feedback signal may be used for tuning optical frequency of the laser diode 108B, e.g. by changing the temperature of the laser diode 108B. By adaptively adjusting (tuning) the laser diode 108B on the basis of the feedback signal 120, it is possible for $F_B$ (the optical frequency of the output light 114) to either track ON or to be spaced from ON by a desired fixed frequency gap ($FO_{CN}$) if required.

In a variant of the above embodiment, the signal processor 118 does not provide a feedback signal 120 to the laser diode 108B, but rather applies additional frequency shifting to the signal carrying the digital information 116. As a result of modulating a digital signal that is already digitally frequency shifted at the outset, the optical frequency of the modulated output light 114 will be adjusted as if it had been adjusted optically; however, this is not due to tuning of the laser diode 108B, but rather due to the information-carrying signal having a wider bandwidth.

In accordance with a third non-limiting embodiment, information regarding the frequency difference between the access node laser and the central node laser is measured at the central node. This "frequency difference information" is sent to the access node via the signal from the central node or using other means. Since the central node 10 receives combined uplink signals from multiple access nodes, it detects the frequency difference between each access node laser and the central node laser, and sends the appropriate frequency difference information to the appropriate access node.

Figure 8:
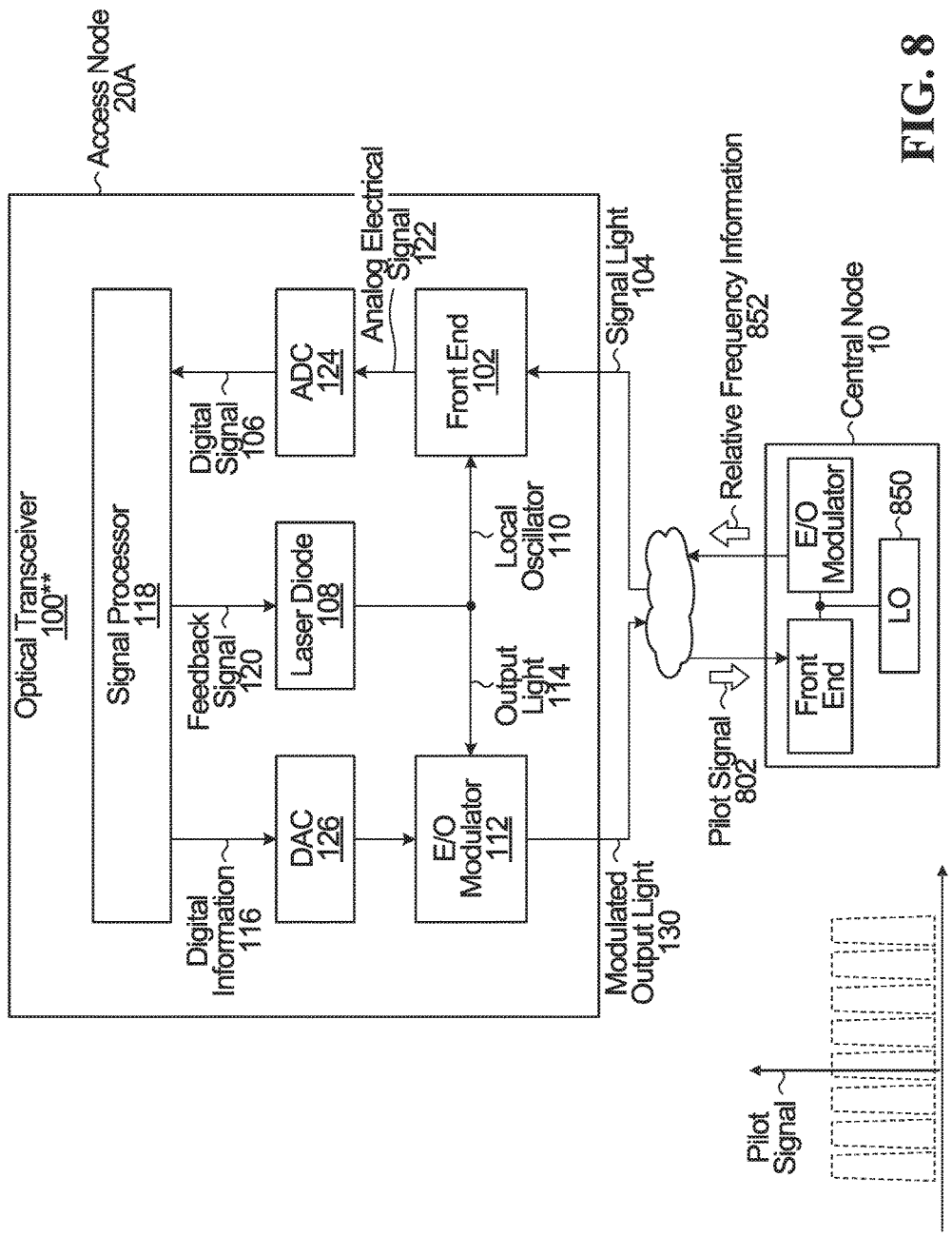
FIG. 8 is a block diagram of an optical transceiver, in accordance with a further non-limiting embodiment.

FIG. 8 is a block diagram of an optical transceiver 100 in accordance with this third non-limiting embodiment. The optical transceiver 100 may be part of access node 20A, for example. Also shown in FIG. 8 is the central node 10 that communicates with access node 20A and also with the other access nodes 20B-20F. In the case of access node 20A, the central node 10 receives signal light 104 from access node 20A and sends output light 114 to access node 20A.

In this embodiment, the central node 10 carries out a step of comparing the optical frequency of a local light source (local light source not shown) to the optical frequency of an uplink signal. The uplink signal may include non-modulated light, or narrowly-modulated light ("pilot signal") 802, sent by access node 20A. This initially non-modulated or narrowly modulated light may be used to avoid interference to its neighboring channels before its frequency is accurately positioned. The frequency difference between the optical frequency of a local oscillator (LO) 850 at the central node 10 and the optical frequency of the (uplink) pilot signal 802 is detected and analyzed at the central node 10. The narrow modulation, or even lack of modulation may be preferable to avoid signal interference at early stages of the tuning process.

In the case where (i) the pilot signal 802 is generated at the local oscillator frequency LO and (ii) the signal light 104 includes DSC 302 having a known frequency offset $FO_{CN}$ relative to CN, the frequency difference measured by the central node 10 corresponds to FO, as previously described. (Similarly, the central node 10 may compute LOFO, which is the difference between FO and the pre-determined value $FO_{CN}$.) However, FO is now measured and computed at the central node 10 for each access node, rather than at the access nodes themselves; while the corresponding adjustment to LO is not made at the central node 10 but rather at the access node 20A.

Next, the central node 10 sends relative frequency information 852 to the access node 20A. The relative frequency information 852 may be transmitted to the access node 20A via DSC 302, but can also be sent via other techniques or methods, including optical, electrical, wireless, in-band, out-of-band, etc. The relative frequency information 852 may represent a value that reflects FO (or LOFO). In other cases, the relative frequency information may represent an instruction (e.g., higher or lower, possibly with an incremental value) that is computed based on FO (or LOFO). In response to receipt of the relative frequency information 852 at the access node 20A, the signal processor 118 interprets the relative frequency information 852 and generates the feedback signal 120 (which may control a parameter of the laser diode 108). The feedback signal 120 is provided the laser diode 108, causing the optical frequency of the output light 114 to be adjusted.

Thus, in accordance with the above it is seen that a first network element (central node 10) is configured to (i) generate relative frequency information based on a frequency difference between at least one optical frequency component produced at the first network element and at least one optical frequency component in a pilot signal light received at the first network element from a second network element (access node 20A), and (ii) send the relative frequency information back to the second network element. Based at least in part on this relative frequency information, the second network element generates the feedback signal, which is used to adjust an optical frequency of the output light emitted by the second network element. Each respective one of the second network elements may be configured for adjusting an optical frequency of the respective second optical signal based on a relative frequency difference between at least one optical frequency component produced at the respective second network element and at least one optical frequency component produced at the first network element. In particular, each access node may be configured to adjust its local laser frequency based on a frequency offset measured by and fed back from the central node.

In a variant of the above embodiment, the signal processor 118 does not provide a feedback signal 120 to the laser diode 108, but rather applies additional frequency shifting to the signal carrying the digital information 116. As a result of modulating a digital signal that is already digitally frequency shifted at the outset, the optical frequency of the output light 114 will be adjusted as if it had been adjusted optically; however, this is not due to tuning of the laser diode 108, but rather due to the information-carrying signal having a wider bandwidth.

It should be appreciated in one or more embodiments, the transceiver does not begin (or may suspend) transmission of the digital information 116 until LOFO is within a predetermined range or below a certain threshold. Thereafter, transmission of the digital information 116 may commence (or resume).

It should be appreciated that the digital processor 118 may be configured to execute computer-readable instructions stored in a memory. The instructions encode a program (software) which, when executed by the processor, causes the processor to execute a variety of tasks or routines. Each routine controls certain functionality of the optical transceiver based on certain inputs, outputs and/or parameters stored in the memory.

While the above description and diagrams have provided a description and illustration of several example embodiments, it should be appreciated that variations are possible while remaining within the scope of the invention. For example, certain elements that are expected to be known or common to a person of ordinary skill in the art have not been described, while certain features that have been described may be omitted in some embodiments and included in others. Those skilled in the art will of course appreciate that the invention is only to be limited by the claims attached hereto.

The invention claimed is:

1. An optical transceiver comprising:
an optical front end for receiving signal light comprising an optical sub-channel, and for providing a first electrical signal based on the optical sub-channel;
a first light source optically coupled to the optical front end for providing local oscillator light thereto for mixing with the signal light;
an electro-optical modulator coupled to a second light source for modulating output light provided by the second light source with digital information to obtain modulated light;
a mixer coupled to the first and second light sources for obtaining a second electrical signal at a differential frequency between an optical frequency of the output light and an optical frequency of the local oscillator light; and
a signal processor operably coupled to the optical front end and to the mixer and configured for:
processing the first electrical signal to obtain a frequency offset of the optical sub-channel; and
based on the frequency offset of the optical sub-channel and the differential frequency, adjusting an optical frequency of the modulated light.

2. The optical transceiver of claim 1, wherein the signal processor is configured to digitally shift a modulation frequency of the output light to adjust the optical frequency of the modulated light.

3. The optical transceiver of claim 1, wherein the signal processor is configured to provide a feedback signal to the second light source to adjust the optical frequency of the output light, whereby the optical frequency of the modulated light is adjusted.

4. The optical transceiver of claim 3, wherein the light source comprises laser diodes for providing the local oscillator light and the output light, wherein the feedback signal is provided to the second laser diode to adjust an optical frequency thereof.

5. The optical transceiver of claim 3, wherein the first light source comprises a first laser diode for providing the local oscillator light; wherein the second light source comprises a second laser diode for providing the output light; and wherein the signal processor is operably coupled to the mixer and configured for providing the feedback signal to the second laser diode based on the differential frequency.

6. The optical transceiver of claim 1, wherein the signal processor is further configured for:
obtaining a difference between the frequency offset of the optical sub-channel and a reference frequency value; and
adjusting the optical frequency of the modulated light based on the difference.

7. The optical transceiver of claim 1, wherein the light source is absent a wavelength locker.

8. An optical transceiver comprising:
an optical front end for receiving signal light;
a light source optically coupled to the optical front end for providing local oscillator light thereto for mixing with the signal light;
an electro-optical modulator coupled to the light source for receiving output light therefrom and for modulating the output light with digital information to obtain modulated light for sending to a remote node; and
a signal processor operably coupled to the optical front end and configured for:
obtaining, from the remote node, a first feedback signal based on an optical frequency of the modulated light received at the remote node; and
adjusting the optical frequency of the modulated light based on the first feedback signal.

9. The optical transceiver of claim 8, wherein the signal processor is configured to digitally shift a modulation frequency of the output light based on the first feedback signal, whereby the optical frequency of the modulated light is adjusted.

10. The optical transceiver of claim 8, wherein the signal processor is configured to adjust an optical frequency of the output light based on the first feedback signal, whereby the optical frequency of the modulated light is adjusted.

11. A method, comprising:
mixing local oscillator light with received signal light comprising an optical sub-channel and converting a result of the mixing to a first electrical signal, wherein the electrical signal is based on the optical sub-channel;
processing the electrical signal to obtain a frequency offset of the optical sub-channel;
modulating output light with digital information to obtain modulated light;
obtaining a second electrical signal at a differential frequency between an optical frequency of the output light and an optical frequency of the local oscillator light; and
adjusting an optical frequency of the modulated light based at least in part on the frequency offset of the optical sub-channel and on the differential frequency.

12. The method defined in claim 11, wherein the mixing and processing are carried out at a second network element and the received signal light is received from a first network element in communication with the second network element, and wherein the modulating and adjusting are carried out at the second network element.

13. The method defined in claim 11, wherein adjusting the optical frequency of the modulated light comprises digitally shifting a modulation frequency of the output light to adjust the optical frequency of the modulated light.

14. The method defined in claim 11, wherein adjusting the optical frequency of the modulated light comprises adjusting an optical frequency of the output light, whereby the optical frequency of the modulated light is adjusted.

15. The method defined in claim 14, further comprising obtaining a difference between the frequency offset of the optical sub-channel and a reference frequency value, and wherein adjusting the optical frequency of the output light comprises adjusting the optical frequency of the output light based on the difference.

16. The method defined in claim 11, wherein the mixing and processing are carried out at a first network element and the received signal light corresponds to the output light transmitted to the first network element by a second network element, and wherein the modulating and adjusting are carried out at the second network element.

17. The method defined in claim 16, further comprising pausing or reducing a frequency of modulation of the output light with the digital information until the frequency offset falls below a pre-determined threshold.

18. The method defined in claim 17, wherein the method further comprises the second network element transmitting a narrower modulated signal in the output light during an initial adjustment phase and a wider modulated signal in the output light during a subsequent adjustment phase.

19. An optical communication system, comprising:
a first network element; and
a plurality of second network elements;
the first network element broadcasting a first optical signal to the plurality of second network elements;
each one of the second network elements transmitting a respective one of a plurality of second optical signals to the first network element;
wherein each respective one of the second network elements is configured for adjusting an optical frequency of the respective second optical signal based on an optical frequency difference between a local light produced at the respective second network element and the first optical signal produced at the first network element.

20. The optical communication system defined in claim 19, wherein each respective second network element is configured to obtain the respective optical frequency difference by mixing the first optical signal and the local light, wherein at least a portion of the local light is used to produce the respective second optical signal.

* * * * *